Aug. 5, 1958 E. M. GUSTAFSON ET AL 2,846,625

SEMICONDUCTOR DEVICE

Filed March 31, 1955

INVENTORS
Allen I. Swartz
Elmer M. Gustafson
BY George W. Crowley
ATTORNEY

United States Patent Office 2,846,625

Patented Aug. 5, 1958

2,846,625

SEMICONDUCTOR DEVICE

Elmer M. Gustafson, Beverly, and Allen I. Swartz, Malden, Mass., assignors to Columbia Broadcasting System, Inc., Danvers, Mass., a corporation of New York Application March 31, 1955, Serial No. 498,136

5 Claims. (Cl. 317—234)

Figure 2:
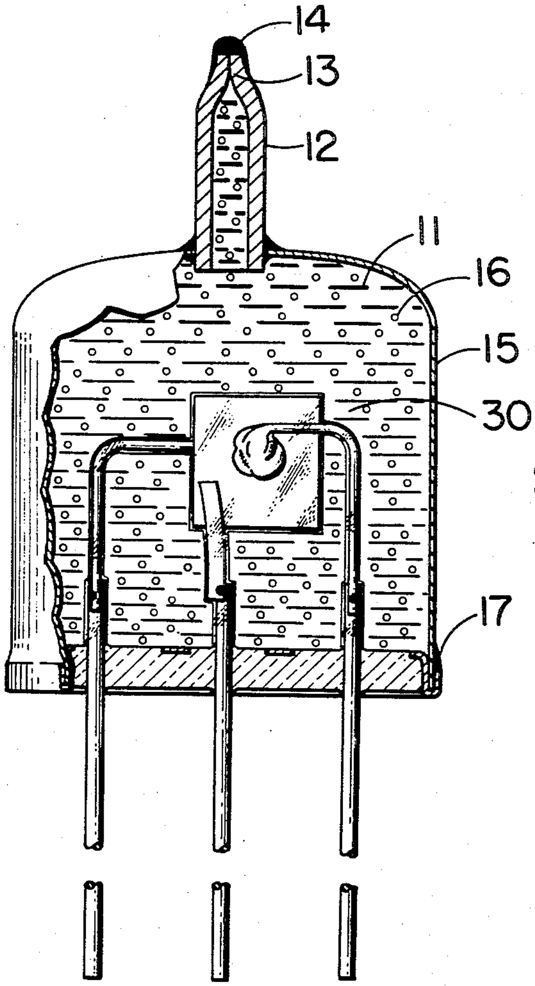

This invention relates to semiconductors in general and to power type transistors in particular.

Experience has shown that a hermetically sealed transistor or diode has a longer life than those which have not been sealed. Experience has also shown that transistors which dissipate more than approximately 100 milliwatts must be cooled in order to operate properly. It has been the practice in the art to seal such so-called power transistors in air-tight liquid-filled containers in an attempt to obtain long life and proper operation.

The results of sealing and cooling power transistors have not been uniform. The characteristic of the transistor most affected by the coolant is the so-called back resistance. The back resistance invariably decreases. The decrease in back resistance may be noted by impressing a fixed voltage across the transistor and observing the increase in collector cut-off current with time. The change is sufficient in most cases to destroy the usefulness of the transistor in a short time.

In view of the proven fact that some sealed semiconductors without coolants maintain a high back resistance indefinitely, it is evident that the coolant used may cause the shortening of life of power transistors. The obvious remedy would be to use a coolant which does not deleteriously affect the characteristics of the transistor. For example, liquids of the monophenyl aromatic hydrocarbon group may be adapted to the purpose. No coolant is presently commercially available which is more inert, has a higher heat conductivity or better electrical characteristics. Other common coolants for electrical apparatus such as carbon tetrachloride or silicone fluids do not have all the desired characteristics or are too expensive to use.

Unfortunately, any monophenyl aromatic hydrocarbon of even the highest commercial grade contains traces of water. The molecules of water in the coolant tend to become ionized and migrate to the junction of the semiconductor during operation. The ohmic resistance of the ionized molecules is very low, and, in time, a sufficient amount of ionized water collects at the junction to shunt the very high back resistance of the device. Such shunting increases the collector cutoff current rapidly, eventually destroying the transistor.

It is not economically feasible to remove the minute traces of water from the coolant permanently. Even if the water is removed, provisions must be made to prevent recontamination by moisture contained in the atmosphere. This means that the coolant must be kept from contact with the atmosphere, making practical manufacturing of transistors difficult if not impossible.

Water is not the only source of contaminants having polar molecules which must be considered in practical transistors. The surfaces of the metals and materials used to construct transistors adsorb gases and liquids. It is possible, therefore, that such adsorbed liquids or gases are released to effect the life of the transistors in the same manner as polarized contaminants in the coolant.

Even a completely moisture-free coolant, therefore, will not completely remedy the situation, since these adsorbed contaminants are not necessarily neutralized by the coolant.

Improvement in the resitsance of all types of transistors to mechanical stresses engendered by vibration and shock is also desired to make the transistor more useful commercially. A liquid coolant may damp the motion of the parts immersed therein, but the mechanical rigidity of the parts will not be increased. The mechanical rigidity of the individual lead-in wires must be increased if the shock resistance of the transistor is to be increased to any appreciable degree.

The noise figure of the presently-known semiconductor devices increases with time. The exact reason for such deterioration of such an important electrical characteristic is not known. It is thought that the increase in noise figure may be due to a complex metallurgical reaction at the exposed semiconductor junction surface, combined with a slight mechanical motion of the lead-in wires.

Therefore, it is the general object of this invention to provide a liquid-cooled semiconductor device which does not suffer from the above-mentioned disadvantages.

It is a further object of this invention to provide a semiconductor device having a high resistance to mechanical shock.

It is a still further object to provide a semiconductor device having a low noise figure.

It is another object of this invention to provide a semiconductor device having a long useful life.

Figure 1:
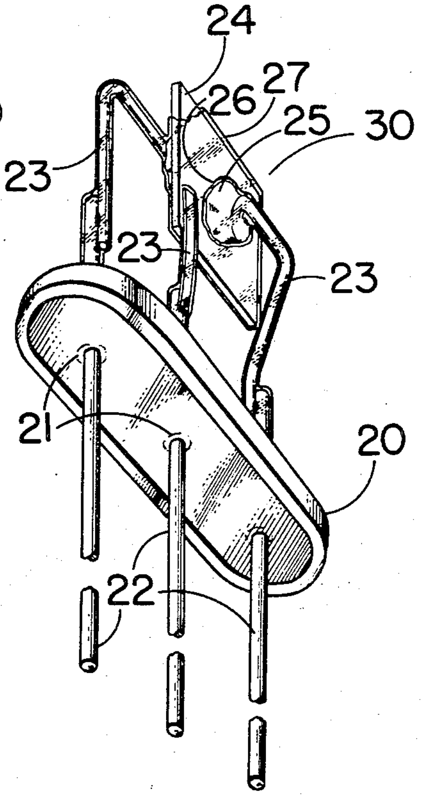

For a better understanding of the invention together with other and further objects, features and advantages, reference should be made to the following description which is to be read in connection with the drawings in which:

Fig. 1 is a perspective drawing of the semiconductor device before assembly into its hermetically sealed case; and Fig. 2 is a perspective drawing of a semiconductor device embodying the features of this invention cut to show the inside of the hermetically sealed case.

In general, the invention may be described in the following way. The coolant for a sealed semiconductor device is freed from all traces of active contaminants having polar molecules. Although water is the most common of such contaminants, minute traces of other substances having polar molecules are found in any coolant. The contaminants are inactivated by introducing into the coolant a scavenger to which the contaminants have a great affinity. When the contaminants react with the scavenger, the contaminants are neutralized so that it is no longer possible that adverse action take place between the semiconductor device and the contaminants. It is immaterial whether or not the reaction between the scavenger and the contaminants be of a chemical or physical nature, although the physical process of adsorption is preferred to avoid any chemical reaction which may produce a deleterious effect.

The semiconductor device itself is treated separately to remove all traces of active contaminants having polar molecules by removing any adsorbed contaminants during the manufacturing process. The contaminants may be present in either a liquid or gaseous form in the microscopic crevices existing on all surfaces. The cleaner must penetrate such crevices and remove the contaminants. Such an object can be attained if the surface tension of liquid contaminants or the vapor pressure of gaseous contaminants can be reduced by contact with the cleaner. It is highly desirable that recontamination be prevented in such a manner that the semiconductor device can be handled without special precautions. It is desirable, therefore, to use a cleaner which, on drying, leaves a hard impermeable solid residue covering the semiconductor device. Such a coating imparts additional strength to the semiconductor device, improving both the noise figure and the shock resistance of the device as well as protecting the device from recontamination and abrasion during the manufacturing process and in operation in various types of electrical circuits.

Cleaning of both the coolant and the surface of the semiconductor device cannot be done with one cleaning agent to best advantage. It is preferred, therefore, that a solid hygroscopic material, crushed so that the particles are of appropriate size, be used for cleaning the coolant. A volatile liquid which, on drying, leaves an impermeable residue is preferred for cleaning the semiconductor device.

Referring now to Fig. 1, a typical semiconductor device having a clean and abrasion-proof surface may be seen. It should be noted that the illustrated device has three lead-in wires 22 connected to various parts of the semiconductor base material 24 in various ways. The number and method of connecting lead-in wires is immaterial to the invention, depending merely on the particular type of semiconductor device being made. Each lead-in wire 22 may be cut to an appropriate length and inserted through insulating bushings 21 in the metallic base plate 20. Appropriately shaped leads 23 may be attached to each of the lead-in wires 22 to connect the lead-in wires 22 with predetermined portions of the semiconductor base material 24. The manner in which the shaped leads 23 are attached to the lead-in wires 22 is immaterial to the invention; a spot weld is shown although soldering would serve as well. Each of the outer leads 23 may be connected to the semiconductor base material 24 through an indium button 25. The indium button 25, in turn, may be fused to the semiconductor base material 24 to obtain the desired type of directional electrical characteristics. The third lead 23 may be connected directly to the semiconductor base material 24. Again the manner in which the connection is made between the formed leads 23 and the indium buttons 25 or the semiconductor base material 24 is not material to the invention. The semiconductor base material 24 may be any one of a variety of substances; the illustrated base material 24 being silicon. The barrier 26 which gives the device its desired electrical characteristics is formed between each indium button 25 and the semiconductor base material 24. It will be observed that although the greater portion of such a barrier 26 lies beneath each indium button 25 that there must be an exposed portion of the barrier 26. It is well-known that a potential difference exists across the barrier 26 when an electrical current flows through a semiconductor device. Since a difference in potential exists, an electric field exists. Polar molecules (not shown) will be attracted by the electric field and will tend to line up across the barrier 26, forming a path, the ohmic resistance of which is relatively low. When the potential difference is large for a given current, the ohmic resistance of the barrier 26 by itself is high. In such a case, even a small amount of shunting of the barrier 26 by polar molecules reduces the ohmic resistance of the barrier appreciably.

Polar molecules from the atmosphere, such as water vapor, are prevented from shunting the ohmic resistance of the barrier 26 in the preferred embodiment of this invention by an impermeable coating 27. Even though it be assumed that polar molecules are attracted by an electric field across the barrier 26, such molecules cannot form an electrical circuit across the barrier 26. The coating 27 may be formed of various materials in a variety of ways. The illustrated coating 27 is substantially pure nitrocellulose left as a residue after evaporation of the solvent from "Collodion," a trade name for a mixture of ether and nitro-cellulose.

In processing, semiconductor assembly 30 may be grasped by the lead-in wires 22 or the base 20 and dipped in Collodion until the base material 24, the indium buttons 25 and substantially all the formed leads 23 are completely covered. The assembly 30 then may be placed on a rack (not shown) and allowed to dry at room temperature. Care must be taken to keep the wetted portion of the assembly 30 from any physical contact with any part of the drying rack in order that a complete coating 27 may be obtained. During the time the coating 27 is drying, the ether contained in the Collodion reacts with impurities on the coated surfaces and removes them as the ether evaporates. The semiconductor assembly 30 is ready for assembly into a hermetically sealed case as soon as the Collodion dries. The impermeable coating 27 prevents recontamination of the exposed active surfaces sufficiently well that immediate assembly into the case is not required.

Fig. 2 shows a semiconductor assembly 30 having a coating 27 in a hermetically sealed container. A metallic cover 15 may be placed over a coated assembly 30. The crack between the bottom of the cover 15 and the periphery of the base 20 of the coated assembly 30 may be sealed. The method with which the seal is made is not material to the invention. For simplicity, an air-tight solder joint 17 is shown. During the time that the solder joint 17 is being made, the filling vent 12 is open so that no pressure builds up inside the cover 15 to prevent an air-tight seal being made. After the solder joint 17 is made, the liquid coolant 11 may be introduced through the filling vent 12. It is desirable that the coolant 11 be introduced slowly while agitating the device in order to eliminate air pockets. After enough coolant 11 has been introduced to completely fill all the vacant spaces inside the cover 15, the end 13 of the filling vent 12 may be pinched off and sealed with a drop of solder 14.

The coolant 11 may be any monophenyl aromatic hydrocarbon although commercially pure toluene is preferred. Suspended in the coolant 11 is a desiccant 16. It is preferred that granulated activated alumina ($Al_2O_3$) be used. The desiccant 16 serves as a scavenger in the coolant, neutralizing any polar molecules contained therein or any polar molecules which may be liberated from the walls of the cover 15. The amount of desiccant contained in the coolant 11 may be varied over very large limits. As a practical matter, it is preferred that not less than 0.1% nor more than 25% desiccant 16 by weight be used to ensure the presence of a sufficient amount to counteract any concentration of polar molecules which may be encountered.

The need for an increase in abrasion resistance of the semiconductor assembly 30 due to the coating 27 becomes evident from Fig. 2. It is obvious that the particles of desiccant 16 will, if the device is subjected to vibration, abrade the various parts of the semiconductor assembly 30. Subjecting an assembly having a solid desiccant such as 16 to vibration causes failure of the joint between the indium buttons and the formed leads to occur unless the desiccant 16 is prevented from contacting the semiconductor assembly 30. It may be seen that in the preferred embodiment that contact between the desiccant 16 and any part of the semiconductor base material or indium buttons is prevented by the impermeable coating 27.

The coolant 11 is, as previously stated, preferably toluene. The electrical and chemical characteristics of toluene are such that no reaction takes place between the coolant 11 and the semiconductor device 30 or the cover 15. The preferred desiccant 16 is activated alumina in granular form. In this embodiment, the desiccant 16 contains appreciable amounts of oher oxides than aluminum. The impurities in a typical lot of commercially pure activated alumina are sodium monoxide ($Na_2O$), silica ($SiO_2$), ferric oxide ($Fe_2O_3$) and titania ($TiO_2$). Fortunately, none of the impurities dissociate since toluene is not an electrolyte. In fact, it may be shown that the traces of sodium monoxide present in the desiccant assist in the removal of any water dissolved in the toluene by forming sodium hydroxide. Therefore, no conductive ions are liberated to shunt the ohmic resistance of the barrier 26 during operation.

The manner in which the coating 27 improves the noise figure is not completely understood. However, it may be shown that semiconductor devices made according to this invention have unexpectedly low noise figures even though the primary purpose of the coating 27 is to strengthen and protect the semiconductor assembly 30. It is felt that the improvement in noise figure is due to a combination of maintenance of an uncontaminated barrier and the mechanical strengthening of the formed wires 23 to the base material 24.

Although the invention has been illustrated and described in connection with one practical transistor in which it has been incorporated, it is believed that the concept of simultaneously providing a desiccant and strengthening film to improve the life of all types of semiconductors including diodes and phototransistors is sufficiently broad that many modifications thereof will suggest themselves to those skilled in the art. In particular it should be noted that other desiccants such as calcium sulphate, silica gel, and phosphoric anhydride which absorb moisture or such materials as sodium-aluminum-silicate in the form known in the art as "moleculous sieves" may be used in place of alumina. Furthermore, the coolant may be taken from any of a large group of organic liquids, notably the aromatic hydrocarbons. Such substitutions are believed to be within the spirit and scope of the present invention as defined in the appended claims.

What is claimed is:

1. In a hermetically sealed semiconductor device, a coolant comprising, a liquid and a hygroscopic solid suspended therein, said liquid being selected from the group consisting of the monophenyl hydrocarbons.

2. In a hermetically sealed semiconductor device, a coolant comprising, toluene and finely divided alumina, said coolant containing at least 0.1% of said alumina, by weight.

3. In a hermetically sealed semiconductor device, a coolant comprising, a mixture of a monophenyl hydrocarbon and a hygroscopic material, said mixture being at least 0.1% by weight of said hygroscopic material.

4. A semiconductor device comprising, a hermetically sealed container, a plurality of lead-in wires, a semiconductor, an impervious plastic film and a coolant, said lead-in wires projecting through said container at predetermined points and affixed thereto, the inward end of each of said lead-in wires being attached to predetermined points on said semiconductor whereby said container, lead-in wires and semiconductor form a unitary mass, said impervious film covering said semiconductor and a predetermined portion of said lead-in wires adjacent said semiconductor, said coolant displacing substantially all the remaining space in said container and consisting of alumina suspended in toluene, there being at least 0.1% alumina by weight in said coolant.

5. A semiconductor device in a hermetically sealed container having an impervious plastic coating on said semiconductor and a substantially water-free interior in said hermetically sealed container the space within said interior being between the inner walls of said container and said semiconductor being filled with a coolant consisting of finely divided alumina suspended in toluene.

References Cited in the file of this patent

UNITED STATES PATENTS

| | | |
|---|---|---|
| 1,865,213 | Ruben | June 28, 1932 |
| 2,288,341 | Addink | June 30, 1942 |
| 2,344,969 | Claffey | Mar. 28, 1944 |
| 2,356,095 | Schulze | Aug. 15, 1944 |
| 2,628,271 | Brafman | Feb. 10, 1953 |
| 2,683,767 | Cunningham | July 13, 1954 |
| 2,688,110 | Domaleski et al. | Aug. 31, 1954 |
| 2,716,722 | Rothstein | Aug. 30, 1955 |
| 2,753,497 | Jenkins et al. | July 3, 1956 |
| 2,787,744 | Brock et al. | Apr. 2, 1957 |

OTHER REFERENCES

Altieri Gas Chemists Book of Standards, first ed., pp 44 and 45, published by American Gas Association, Inc., 420 Lexington Ave., N. Y., N. Y.